(12) United States Patent
Barataud-Dien et al.

(10) Patent No.: US 7,985,274 B2
(45) Date of Patent: Jul. 26, 2011

(54) HIGH SPECIFIC SURFACE SILICON CARBIDE CATALYTIC FILTER AND SUPPORT

(75) Inventors: Carine Barataud-Dien, Lambesc (FR); Patricia Andy, Les Taillades (FR); Sebastien Bardon, Cambridge, MA (US); Anthony Briot, Saint Saturnin les Avignon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 332 days.

(21) Appl. No.: 11/996,868

(22) PCT Filed: Jul. 19, 2006

(86) PCT No.: PCT/FR2006/050730
§ 371 (c)(1),
(2), (4) Date: Mar. 5, 2008

(87) PCT Pub. No.: WO2007/012776
PCT Pub. Date: Feb. 1, 2007

(65) Prior Publication Data
US 2008/0202080 A1    Aug. 28, 2008

(30) Foreign Application Priority Data

Jul. 28, 2005 (FR) ..................... 05 52357

(51) Int. Cl.
*B01D 39/14* (2006.01)
*B01D 39/06* (2006.01)
*B01D 39/00* (2006.01)
*B01D 50/00* (2006.01)
*F01N 3/00* (2006.01)

(52) U.S. Cl. .............. 55/523; 55/522; 55/524; 60/297; 422/169; 422/170; 422/171; 422/172; 422/177; 422/178; 422/179; 422/180; 422/181; 422/182; 264/628; 264/630

(58) Field of Classification Search ............ 55/522–524; 422/169–182; 60/297; 264/628, 630
See application file for complete search history.

(56) References Cited

U.S. PATENT DOCUMENTS

| | | | | |
|---|---|---|---|---|
| 4,464,185 A | * | 8/1984 | Tomita et al. | 55/310 |
| 5,449,654 A | * | 9/1995 | Prin et al. | 502/178 |
| 6,251,819 B1 | * | 6/2001 | Prin et al. | 502/178 |
| 6,555,031 B2 | * | 4/2003 | Gadkaree et al. | 264/29.7 |
| 6,582,796 B1 | * | 6/2003 | Joulin et al. | 428/116 |
| 6,669,751 B1 | * | 12/2003 | Ohno et al. | 55/523 |
| 6,803,086 B2 | * | 10/2004 | Noguchi et al. | 428/116 |
| 7,479,265 B2 | * | 1/2009 | Pham et al. | 423/345 |
| 2002/0011683 A1 | | 1/2002 | Gadkaree et al. | |
| 2002/0053202 A1 | * | 5/2002 | Akama et al. | 60/297 |
| 2003/0093982 A1 | * | 5/2003 | Suwabe et al. | 55/523 |
| 2004/0028587 A1 | * | 2/2004 | Twigg | 423/213.2 |
| 2005/0095179 A1 | * | 5/2005 | Kasai et al. | 422/177 |
| 2005/0159292 A1 | | 7/2005 | Pham et al. | |
| 2005/0210848 A1 | * | 9/2005 | Kuki et al. | 55/523 |
| 2006/0021310 A1 | * | 2/2006 | Ohno et al. | 55/523 |
| 2008/0022644 A1 | * | 1/2008 | DeRosa | 55/523 |

FOREIGN PATENT DOCUMENTS

| | | |
|---|---|---|
| EP | 0 761 279 A2 | 3/1997 |
| EP | 1 070 687 A1 | 1/2001 |
| EP | 1 493 722 A1 | 1/2005 |
| EP | 1 552 882 A1 | 7/2005 |
| JP | 09313843 A * | 12/1997 |

* cited by examiner

*Primary Examiner* — Duane Smith
*Assistant Examiner* — Amber Orlando
(74) *Attorney, Agent, or Firm* — Oblon, Spivak, McClelland, Maier & Neustadt, L.L.P.

(57) ABSTRACT

The invention relates to a honeycomb structure, made from a porous ceramic material, said structure being characterized in that the porous ceramic material which forms it comprises: from 50 to 95% by weight of silicon carbide SiC; from 5 to 50% by weight of at least one ceramic oxide phase, said structure additionally being characterized by a porosity greater than 10%, by a specific surface area greater than 0.5 $m^2/g$ and by a pore size distribution of at least bimodal type. The invention also relates to the process for obtaining such a structure and also to the catalytic support or filter obtained from such a structure, after deposition of a catalyst.

18 Claims, No Drawings

HIGH SPECIFIC SURFACE SILICON CARBIDE CATALYTIC FILTER AND SUPPORT

The present application is the U.S. counterpart of WO 07/012,776, the text of which is incorporated by reference and claims, as priority, the French Application No. 05/52357, filed on Jul. 28, 2005, the text of which is incorporated by reference.

The invention relates to the field of catalytic structures, especially used in an exhaust line of a diesel-type internal combustion engine. Preferably, the invention relates to catalytic filters that make it possible to jointly remove pollutant gases and soot produced by the combustion of a diesel fuel in a diesel engine.

The catalytic filters that enable the treatment of gases and the removal of soot from a diesel engine are well known in the prior art. These structures all usually have a honeycomb structure, one of the faces of the structure allowing the intake of the exhaust gases to be treated and the other face the discharge of the treated exhaust gases. The structure comprises, between the intake and discharge faces, a set of adjacent ducts or channels with axes parallel with one another separated by porous walls. The ducts are stopped at one or other of their ends to delimit inlet chambers opening on the intake face and outlet chambers opening on the discharge face. The channels are alternately stopped in an order such that the exhaust gases, as they pass through the honeycomb body, are forced to pass through the side walls of the inlet channels in order to join the outlet channels. In this way, the particles or soot are deposited and accumulate on the porous walls of the filtering body.

In a known manner, during its use, the particle filter is subjected to a succession of filtration phases (accumulation of soot) and regeneration phases (removal of soot). During the filtration phases, the soot particles emitted by the engine are retained and are deposited inside the filter. During the regeneration phases, the soot particles are burnt inside the filter, in order to restore its filtration properties thereto.

Usually, the filters are made of a porous ceramic material, for example silicon carbide.

Examples of catalytic filters are, for example, described in patent applications EP 816 065, EP 1 142 619, EP 1 455 923 or else WO 2004/090294 and WO 2004/065088.

In addition to the problem of treating soot, the conversion of gas-phase polluting emissions (that is to say mainly nitrogen oxides ($NO_x$) or sulfur oxides ($SO_x$) and carbon monoxide (CO), or even unburnt hydrocarbons) to less harmful gases (such as gaseous nitrogen ($N_2$) or carbon dioxide ($CO_2$)) requires an additional catalytic treatment.

In order to treat gaseous and solid pollutants during one and the same step, it is desired to add a catalytic function to the particle filter previously described. According to the processes conventionally used, the honeycomb structure is impregnated by a solution comprising the catalyst or a catalyst precursor.

Such processes generally comprise at least one step of impregnation by immersion either in a solution containing a catalyst precursor or the catalyst dissolved in water (or another polar solvent), or a suspension in water of catalytic particles. An example of such a process is described by U.S. Pat. No. 5,866,210.

In a known manner, the impregnation process may be carried out in one or more steps. The impregnation step or steps aim to deposit the catalyst in the structure as uniformly as possible.

Usually the catalyst comprises an active principle that includes precious metals (Pt, Pd, Rh) and optionally a rare-earth oxide, for example a mixture of platinum and cerium oxide $Pt/CeO_2$. The active principle is normally deposited, according to techniques well known in heterogeneous catalysis, in the porosity of an oxide support having a high specific surface area, for example alumina, titanium oxide, silica, cerine, zirconium oxide.

It is furthermore known that the introduction of a particle filter such as described previously into the exhaust line of the engine leads to a pressure drop capable of impairing the performance of this engine. The porosity of the filter is consequently chosen to be high enough to avoid such an impairment and is generally between 20 and 75%.

The pressure drop is even greater when the filter comprises a catalytic function. This is because the deposit of the catalytic coating, in particular of the catalyst support such as previously described, on the walls and/or in the porosity of the structure tends to further increase the pressure drop due to the presence of the filter in the exhaust line. Due to this limitation, the amounts of catalyst deposited and consequently the efficiency of the catalytic treatment of the exhaust gases are currently limited.

It results from the aforementioned that there is a need to obtain a filtering structure on which the microstructure (porosity, pore size and distribution) can enable an increased amount of catalyst to be deposited so as to increase the efficiency of the treatment of the gases, but without however resulting in a high increase in the pressure drops.

One possible solution consists in increasing the porosity of the network of silicon carbide grains, for example by the presence, in the initial mixture, of a large amount of a pore-forming agent, of the synthetic resin type such as acrylic resin or organic polymer such as starch. However, the increase of the porosity leads, at the same time, to a severe decrease in the mechanical properties of the filter, which reduces the operating performance thereof.

The objective of the present invention is thus to provide a honeycomb structure of a novel type, which makes it possible to respond to the problems explained previously.

In a general form, the present invention relates to a honeycomb structure comprising a mixture of alumina and silicon carbide grains:
a) having a porosity approximately equal to or not very different from that of the silicon carbide structures currently used as a simple filter, that is to say non-catalyzed; and
b) having a high specific surface area.

The expression "high specific surface area" is understood in the sense of the present description to mean a specific surface area greater than $0.5 \text{ m}^2/\text{g}$. By way of information, the tests carried out by the applicant have shown that the specific surface area of the SiC filters currently used does not exceed $0.2 \text{ m}^2/\text{g}$. Such an increase of the specific surface area makes it possible to substantially decrease the amount of support which must be deposited in the structure in order to increase the specific surface area thereof, or even to render its presence pointless for the highest values of the specific surface areas obtained according to the invention, only the active principle then being deposited according to this mode.

From European patent EP 1 070 687 B1, honeycomb monolithic structures are known that can be used as a particle filter for the exhaust gases of diesel engines and that comprise from 70 to 97% by weight of silicon carbide and from 3 to 30% of an oxide binder phase, for example alumina $Al_2O_3$. The object of that invention is to provide a process for obtaining such monoliths at reduced curing temperatures, which do not exceed 1650° C. However, due to the high temperatures described in this process and a pore distribution of monomodal type that is centered between 5 and 60 microns, the specific surface areas obtained are less than 0.5 m²/g. In particular, patent EP 1 070 687 B1 does not mention the possible use of the structure as a catalytic filter or support.

More particularly, according to a first embodiment, the present invention relates to a honeycomb-type structure, made from a porous ceramic material, said structure being characterized in that the porous ceramic material which forms it comprises:

from 50 to 95% by weight of silicon carbide SiC;
from 5 to 50% by weight of at least one ceramic oxide phase, said structure additionally being characterized by a porosity greater than 10%, by a specific surface area greater than 0.5 m²/g, preferably greater than 1 m²/g and very preferably greater than 1.5 m²/g, and by a pore size distribution of at least bimodal type.

The ceramic oxide phase is, for example, obtained from one or more precursors of said oxide phase, of which the initial specific surface area is greater than 2 m²/g, preferably greater than 5 m²/g, or even greater than 10 m²/g.

Preferably, at least 5% of the weight of the precursors is composed of a powder that is in a nanoscale form. Preferably, weight amounts between 5 and 50% of nanoscale powder, for example between 10 and 40% by weight, are used. The tests carried out by the applicant have shown that the presence of this nanoscale powder advantageously made it possible to obtain an at least bimodal pore distribution in the final structure, after curing.

Examples of oxide phases are aluminum, rare-earth, especially cerium or lanthanum, zirconium, titanium and silicon oxides and silicoaluminates.

Preferably, the honeycomb structure comprises:
from 50 to 95% by weight of silicon carbide SiC;
from 5 to 50% by weight of at least one single or mixed ceramic oxide phase obtained from at least one alumina and/or at least one aluminate of which the initial specific surface area is greater than 2 m²/g, preferably greater than 5 m²/g, or even greater than 10 m²/g.

Advantageously, the constituent ceramic material has an overall porosity between 20 and 65%, preferably between 30 and 60%.

The pore size distribution in the structure according to the invention is of at least bimodal type. For example, one part of the pores has a size centered about an average diameter between 5 and 60 microns, preferably between 5 and 20 microns and the other part of the pores has a size centered about an average diameter of around 1.5 to 1 micron or less than 1.5 or even 1 micron and preferably between 1.5 and 0.0015 microns.

The present invention relates, in particular, to a structure incorporating a central part comprising a honeycomb filtering element or a plurality of honeycomb filtering elements connected together by a joint cement, said element or elements comprising a set of adjacent ducts or channels with axes parallel with one another separated by porous walls, which ducts are stopped by plugs at one or other of their ends to delimit inlet chambers opening on a gas intake face and outlet chambers opening on a gas discharge face, in such a way that the gas passes through the porous walls.

For example, such a filtering structure comprises a number of channels from 7.75 to 62 per cm², said channels having a cross section of 0.5 to 9 mm², the walls separating the channels having a thickness of around 0.2 to 1.0 mm, preferably of 0.2 to 0.5 mm.

According to one possibility, the weight proportion of the ceramic oxide phase or phases in the structure is greater than 10%, preferably greater than 20% or even 30%.

The present invention also relates to the process for manufacturing a structure such as described previously, in which said structure is obtained from an initial mixture of silicon carbide grains and a single or mixed oxide or from a mixture of oxides having a specific surface area that is greater than 2 m²/g, preferably greater than 5 m²/g, or even greater than 10 m²/g. These oxides may, for example, be introduced into the initial mixture in the form of powders comprising at least one nanoscale fraction that is naturally agglomerated, for example as in the case of boehmite or that is agglomerated by a synthetic chemical route, involving, for example, Van der Waals bonds.

For example, said oxides may comprise an alumina or an aluminate or an alumina and/or aluminate mixture having a high specific surface area.

In general, the silicon carbide grains have a diameter $d_{50}$ of less than 125 microns, typically between 5 and 125 microns.

According to one embodiment, said process comprises a step of kneading the initial mixture resulting in a homogeneous product in the form of a bound paste, a step of extruding said product through a suitable die so as to form monoliths of honeycomb shape, a step of drying the monoliths obtained, for example by heating and/or by microwaves, and a curing step.

The curing step may, for example, be carried out:
under an atmosphere of a neutral gas such as argon, at a temperature that does not exceed 1700° C., preferably that does not exceed 1600° C. and preferably between 1300 and 1600° C.; or
under an atmosphere containing oxygen such as air, at a temperature that does not exceed 1400° C., preferably that does not exceed 1350° C. and preferably between 1200 and 1350° C.

According to one possible embodiment of the process, during the first step, a mixture comprising at least silicon carbide having at least one type of particle size distribution, one or more oxide phases having a high specific surface area, for example an alumina and/or an aluminate, and optionally a pore-forming agent, are kneaded, then at least one organic plasticizer and/or an organic binder and water are added.

In one possible embodiment of the process, the silicon carbide is introduced into the mixture in the form of a powder having at least two types of particle size distribution, for example a granular mixture comprising one fraction of grains having a size that is less than 10 microns and one fraction of grains having a size that is greater than 10 microns. Such a process may advantageously allow a better control of the pore size of the structure finally obtained.

According to one possible embodiment of the present process, for the purpose of controlling the porosity desired for the material forming the monolith structure of the invention, a set of silicon carbide grains is used of which the diameter $d_{50}$ is between 5 and 125 microns and an amount of 0 to 30% by weight, for example from 5 to 20% by weight, of at least one pore-forming agent, chosen as a function of the desired pore size, is added.

For example, in the drying step, the green ceramic monoliths obtained are dried at a temperature ranging from ambient temperature up to 110° C. or by microwaves for a sufficient time to bring the content of chemically unbound water to less than 1% by weight.

In the case of manufacturing a particle filter, the process comprises, in addition, a step of plugging every other channel at each end of the monolith according to well-known techniques.

During the curing step, the monolith structure is generally brought to a temperature between around 750° C. and 1400°

C., preferably between 1200 and 1350° C., under an atmosphere containing oxygen or to a temperature between around 750° C. and 1700° C., preferably between 1300 and 1600° C., under a neutral atmosphere.

The invention additionally relates to a catalytic support or filter obtained from a structure such as described previously and after deposition, preferably by impregnation, of at least one supported or preferably unsupported active catalytic phase, typically comprising at least one precious metal such as Pt, Pd, Rh and optionally an oxide such as $CeO_2$, $ZrO_2$, $CeO_2$—$ZrO_2$.

Such a structure especially finds an application as a catalytic support in an exhaust line of a diesel or petrol engine or as a particle filter in an exhaust line of a diesel engine.

The invention and its advantages will be better understood on reading the following non-limiting examples. In the examples, all the percentages are given by weight.

EXAMPLE 1

In a kneader, the following were mixed:
- 3000 g of SiC having a median grain diameter $d_{50}$ of around 40 microns. In the sense of the present invention, the diameter $d_{50}$ denotes the particle diameter below which 50% by weight of the population are found;
- 1300 g of an alumina powder in the form of a γ-alumina with a specific surface area equal to 30 $m^2/g$, of which 30% by weight was in the form of a nanoscale boehmite; and
- 150 g of a methyl cellulose type organic binder.

The weight percentages were 69.8% for SiC and 30.2% for the alumina powder. The amount of binder represented 3.49% added relative to the dry weight of powders and grains.

Water was added and the mixture was kneaded until a homogeneous paste was obtained that had a plasticity that enabled the extrusion, through a die, of a honeycomb structure of which the dimensions are given in table 1:

TABLE 1

| Geometry of the channels and of the monolith | Square |
| --- | --- |
| Channel density | 180 cpsi (channels per square inch, 1 inch = 2.54 cm) i.e. 27.9 channels/$cm^2$ |
| Wall thickness | 350 μm |
| Length | 15.2 cm |
| Width | 3.6 cm |

Next, the green monoliths obtained were dried by microwaves for a sufficient time to bring the content of chemically unbound water to less than 1% by weight.

The channels of each face of the monolith were alternately plugged according to well-known techniques, for example described in application WO 2004/065088.

The monolith was then cured in air according to a temperature rise of 20° C./hour until a maximum temperature of 1300° C. was reached, which was held for 5 hours.

A monolith was finally obtained, of which the porosity and average pore size, measured by a mercury porosimeter, were 37% and 6 microns respectively.

Analysis by scanning electron microscopy showed a substantially homogeneous structure characterized by the presence of SiC grains surrounded by alumina, establishing areas of contact between said grains.

High-pressure mercury porosimetry analyses, carried out with a Micromeritics 9500 type porosimeter, showed that the pore size distribution was of bimodal type. One part of the pores had a size centered about an average diameter of 7 microns and the other part of the pores had a size centered about an average diameter of 0.15 microns. BET analysis of the monolith showed that the specific surface area of the monolith thus obtained was 1.7 $m^2/g$.

EXAMPLE 2

In this example, a monolith was synthesized starting from the same reactants as those described in example 1. After extrusion, drying and plugging steps identical to those described in example 1, the monolith was then cured in argon according to a temperature rise of 20° C./hour until a maximum temperature of 1600° C. was reached, which was held for 5 hours.

A monolith was finally obtained, of which the porosity and average pore size, measured by a mercury porosimeter, were 37% and 6 microns respectively.

Analysis by scanning electron microscopy showed a substantially homogeneous structure characterized by the presence of SiC grains surrounded by alumina, establishing areas of contact between said grains.

High-pressure mercury porosimetry analyses, for example with a Micromeritics 9500 type porosimeter, showed that the pore size distribution was of bimodal type. One part of the pores had a size centered about an average diameter of 7 microns and the other part of the pores had a size centered about an average diameter of 0.15 microns. BET analysis of the monolith showed that the specific surface area of the monolith thus obtained was 1.1 $m^2/g$.

EXAMPLE 3

Comparative

In this example, a monolith from the prior art was synthesized, of which the walls were exclusively composed of silicon carbide. For this, the same reactants as in example 1 were mixed, but without the supply of alumina powder(s), so as to finally obtain, after curing at a temperature above 2100° C. under argon, a filter of which the walls were solely composed of SiC.

The porosity measured on this reference filter was 37% and the specific surface area was 0.12 $m^2/g$. The pore size distribution was of monomodal type and the pore size was centered about 9 microns.

The comparison of examples 1 and 2 and of the comparative example 3 show that it is possible to obtain, according to the present invention, a structure with porosity substantially equivalent to that of a silicon carbide filter but having a substantially improved specific surface area.

In the preceding description and examples, for reasons of simplicity, the invention has been described in relation with catalyzed particle filters that enable the removal of gaseous pollutants and of soot present in the exhaust gases exiting an exhaust line of a diesel engine.

The present invention however also relates to catalytic supports that enable the removal of gaseous pollutants exiting petrol or even diesel engines. In this type of structure, the honeycomb channels are not obstructed at one or other of their ends. Applied to these supports, the implementation of the present invention has the advantage of increasing the specific surface area of the support and therefore the amount of active phase present in the support, without however affecting the overall porosity of the support.

The invention claimed is:

1. A honeycomb-type structure, made from a porous ceramic material, said structure being characterized in that the porous ceramic material comprises:
   from 50 to 95% by weight of silicon carbide SiC; and
   from 5 to 50% by weight of at least one single or mixed ceramic oxide phase obtained from at least one alumina and/or at least one aluminate of which the initial specific surface area is greater than 2 m$^2$/g,
   said structure additionally being characterized by a porosity greater than 10%, by a specific surface area greater than 0.5 m$^2$/g and by a pore size distribution of at least bimodal type, wherein said porous material is substantially homogenous and formed by SiC grains surrounded by alumina, establishing areas of contact between said grains.

2. The honeycomb structure as claimed in claim 1, in which at least 5% of the weight of the precursor or precursors is composed of a powder that is in a nanoscale form.

3. The structure as claimed in claim 1, in which the constituent ceramic material has an overall porosity between 20 and 65%.

4. The structure as claimed in claim 1, in which one part of the pores has a size centered about an average diameter between 5 and 60 microns, and the other part of the pores has a size centered about an average diameter of around 1.5 microns or less than 1.5 microns.

5. The structure as claimed in claim 1, of which a central part comprises a honeycomb filtering element or a plurality of honeycomb filtering elements connected together by a joint cement, said element or elements comprising a set of adjacent ducts or channels with axes parallel with one another separated by porous walls, which ducts are stopped by plugs at one or the other of their ends to delimit inlet chambers opening on a gas intake face and outlet chambers opening on a gas discharge face, in such a way that the gas passes through the porous walls.

6. The filtering structure as claimed in claim 5, comprising a number of channels from 7.75 to 62 per cm$^2$, said channels having a cross section of 0.5 to 9 mm$^2$, and the walls separating the channels having a thickness of around 0.2 to 1.0 mm.

7. A process for manufacturing a structure as claimed in claim 1, in which said structure is obtained from an initial mixture of silicon carbide grains and a single or mixed oxide or from a mixture of oxides having a specific surface area that is greater than 2 m$^2$/g.

8. The manufacturing process as claimed in claim 7, in which at least 5% of the weight of the single or mixed oxide or of the mixture of oxides is composed of a powder that is in a nanoscale form.

9. The process as claimed in claim 7, in which the silicon carbide grains have a diameter $d_{50}$ of less than 125 microns.

10. The process for manufacturing a structure as claimed in claim 7, comprising a step of kneading the initial mixture resulting in a homogeneous product in the form of a bound paste, a step of extruding said product through a suitable die so as to form monoliths of honeycomb shape, a step of drying the monoliths obtained, and optionally an assembly step and a curing step.

11. The process as claimed in claim 10, in which, during the first step, a mixture comprising at least silicon carbide having at least one type of particle size distribution, one or more oxide phases having a high specific surface area, and optionally a pore-forming agent, are kneaded, then at least one organic plasticizer and/or an organic binder and water are added.

12. The process as claimed in claim 7, characterized in that the silicon carbide is introduced into the mixture in the form of a powder having at least two types of particle size distribution.

13. The process as claimed in claim 7, characterized in that a set of silicon carbide grains is used of which the diameter $d_{50}$ is between 5 and 125 microns and an amount of 0 to 30% by weight of at least one pore-forming agent, chosen as a function of the desired pore size, is added.

14. The process as claimed in claim 10, characterized in that, in the drying step, the green ceramic monoliths obtained are dried by microwaves or at a temperature for a sufficient time to bring the content of chemically unbound water to less than 1% by weight.

15. The process as claimed in claim 10, comprising a step of plugging every other channel at each end of the monolith.

16. The process as claimed in claim 10, characterized in that, in the curing step, the monolith structure is brought to a temperature between around 750° C. and 1400° C. under an atmosphere containing oxygen or to a temperature between around 750° C. and 1700° C. under a neutral atmosphere.

17. A catalytic support or filter obtained from a structure as claimed in claim 1, by deposition of at least one supported or unsupported active catalytic phase comprising at least one precious metal and optionally an oxide of cerium and/or zirconium.

18. A catalytic support in an exhaust line of a diesel or a petrol engine or as a particle filter in an exhaust line of a diesel engine comprising a structure as claimed in claim 17.

* * * * *